Feb. 12, 1963  H. B. WHITEHURST ETAL  3,077,091
FIBER PRODUCTION

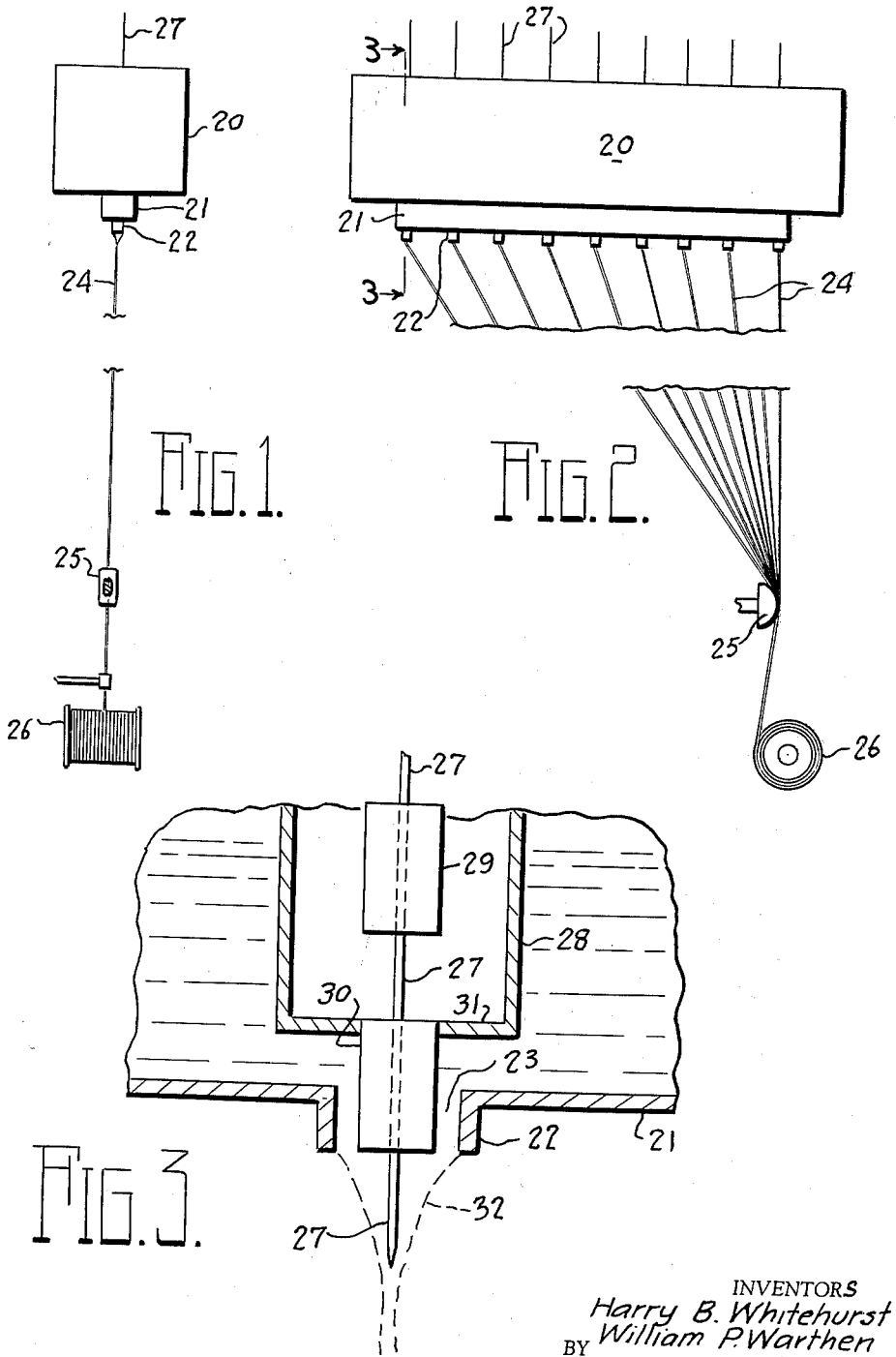

Filed Dec. 28, 1956  2 Sheets-Sheet 2

INVENTORS
HARRY B. WHITEHURST
WILLIAM P. WARTHEN

BY *Staelin & Overman*

ATTORNEY

United States Patent Office 3,077,091
Patented Feb. 12, 1963

3,077,091
FIBER PRODUCTION
Harry B. Whitehurst and William P. Warthen, Newark, Ohio, assignors to Owens-Corning Fiberglas Corporation, a corporation of Delaware
Filed Dec. 28, 1956, Ser. No. 631,339
5 Claims. (Cl. 65—2)

This invention relates to fiber production, and, more particularly, to the production of multiple component fibers comprising glass or a similar vitreous material and a second substance, which may be the same or a different glass or other similar vitreous material, a metal, a resinous material, either synthetic or natural, an oxide material, or the like.

Various suggestions for producing fibers from glass or other similar vitreous material have heretofore been made. In general, such methods involve flowing a stream of the glass, or other material, in a vitrified condition, through a small opening to produce what the art denominates a primary fiber, and in some appropriate manner reducing the diameter of the primary fiber. Such reduction of fiber diameter can be accomplished in any of several ways, for example, by directing a blast of steam, other gas, or even of a liquid against the fibers, by means of a mechanical pulling device which can be a single wheel or a plurality of cooperating wheels, by the action of centrifugal force, by the action of a high velocity blast of hot combustion products, or in other suitable manners. Fiber diameter reduction, in all of these cases, is accomplished by extending a softened stream of the glass to effect attenuation.

It has also been recognized that it is advantageous to apply some kind of coating to fibers of this type, for any of several possible purposes. In many cases a sizing material, which can be an oleaginous size, a resinous size, or other, is applied to the fibers to protect them from abrasion during processing subsequent to formation, and such size is removed before the finished product is put into service. In other instances, a binder, usually of the synthetic resinous type, may be applied to the fibers to support them in a desired relationship in a finished product, for example in glass insulating wool, in filters, or in glass-fiber reinforced resinous bodies produced by lamination, molding or casting techniques.

The present invention is based upon the discovery of a new method for incorporating various materials inside of fibers.

It is, therefore, an object of the invention to provide an improved method for producing fibrous articles composed of two or more different materials.

It is a further object of the invention to provide a method for producing fibers of a glass or other similar vitreous material with bodies of a second material disposed interiorly thereof.

Other objects and advantages will be apparent from the description which follows, reference being had to the accompanying drawings, in which—

FIG. 1 is a schematic representation in front elevation showing a glass melting tank for use in drawing continuous fibers of glass or other similar vitreous material, and relatively small diameter rods passing through a central portion of the melting tank for interior incorporation in the fibers produced;

FIG. 2 is a view in side elevation of the apparatus of FIG. 1;

FIG. 3 is an enlarged view in vertical section along the line 3—3 of FIG. 2;

Figure 4:
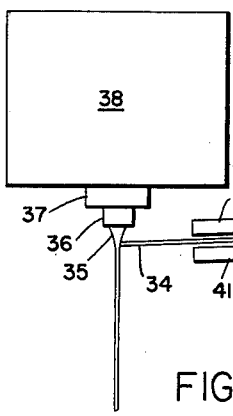
FIG. 4 is a schematic view in vertical elevation showing modified apparatus for introducing in accordance with the invention a relatively small diameter rod of a substance into a fiber of glass or other similar material.

Referring now in more detail to the drawings, the apparatus of FIGS. 1–3 comprises a glass melting tank 20 having a bushing 21 disposed at the lower extremity thereof, and having a plurality of tips 22 which define openings 23 through which streams of molten glass can be flowed from the melting tank 20 to produce fibers of glass or other similar material. As is shown in FIGS. 1 and 2, a plurality of fibers 24 drawn through the openings 23 can be gathered by a shoe 25 and collected on a collet 26 which can be driven in any suitable manner either at substantially the rate that primary fibers are formed by the streams of glass flowing through the openings 23, or at any desired greater rate. When the collet 26 is rotated at a higher rate than that at which primary fibers are produced, the primary fibers while in a molten condition, are extended axially and attenuated, so that their diameters are reduced. Relatively small diameter rods 27 of metal wire or foil, glassy material, or coated glassy material are passed downwardly through the melting tank 20 and through the openings 23 so that they are introduced into the interior of the fibers 24. As can be seen in FIG. 3, the small diameter rods 27 are protected against contact with molten glass in the melting tank 20 by enclosures 28 of a refractory or other material capable of withstanding the temperatures of the molten glass. Guides 29 and 30 are provided to direct each of the rods into the central portion of one of the openings 23. Each of the guides 30 extends from the bottom 31 of one of the enclosures 28 to the central portion of one of the openings 23, so that the rods 27 are introduced into the central portion of a forming cone 32 in which the glass flows into a fiber, and which cone is represented in dotted lines in FIG. 3.

As is shown in FIG. 4, a relatively small diameter rod 34 of metal, glass, or other desired material can be introduced into the exterior of a forming cone 35 of glass or other similar fiberizable material flowing from a tip 36 of a bushing 37 disposed in the bottom of a glass melting tank 38. As shown in FIG. 4, the rod 34 is unrolled from a suitable supply source 39, passed between feed rolls 40, and guides 41, and into the forming cone. This apparatus avoids the necessity for providing an enclosed zone in the central portion of the glass melting tank above each of the several bushing tips, and also enables the introduction of relatively low temperature rods into the glass forming cone. This feature can be advantageous when it is desired to fiberize a glass having a maximum devitrification temperature nearly as high as an operable forming temperature. A relatively cold rod 34 can be introduced into the forming cone 35 of such a glass, and used to chill the molten glass sufficiently rapidly to avoid devitrification during the fiberization process. If the rod 34 is low melting it can be advanced slowly so that it is melted by the hot glass and ultimately appears as a coating on the exterior of the fiber, or it can be advanced more rapidly so that a part of it is incorporated in the interior of the fiber, and the rest is an exterior coating thereon. If the rod 34 melts only above the forming cone temperature, it may be fed at such a rate that it is entirely incorporated in the interior of the fiber.

Figure 5:
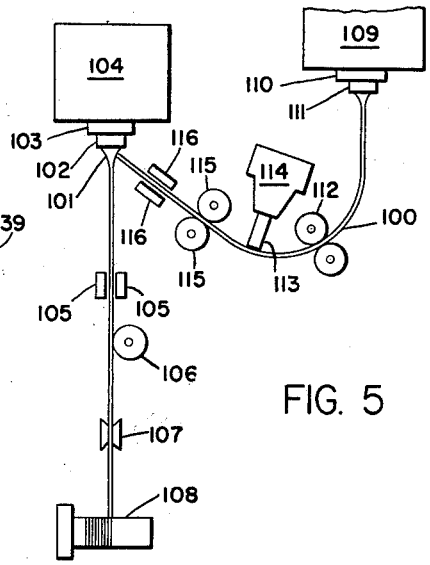
FIG. 5 is a schematic view in vertical elevation showing apparatus similar to that of FIG. 4 for introducing a relatively small diameter rod of a substance into a fiber of glass or other similar material, but wherein the introduced fiber is formed generally concurrently with the modified fiber, is coated with a powdered material, and the modified fiber is, itself, then introduced into the fiber.

A modification of the apparatus of FIG. 4 is shown in FIG. 5. A coated primary fiber 100 of glass or other suitable vitreous material is introduced into a forming cone 101 as it emerges from a tip 102 of a bushing 103 disposed in the bottom of a glass melting tank 104. A fiber drawn from the forming cone 101 is passed downwardly between guides 105, past a size applicator 106, along a gathering shoe 107, and is collected on a suitably driven collet 108. The coated primary fiber 100 is formed by flowing a stream of molten glass from a melting tank 109 through a tip 110 of a bushing 111, passing the resulting primary fiber 100 along a guide 112, and applying a coating of metal, metal oxide, a vitreous material, or the like to the primary fiber from a tube 113 disposed at the lower extremity of a hopper 114. The coated fiber is then passed between pulling wheels 115 and guides 116, and into the forming cone 101.

Figure 6:
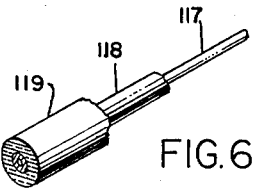
FIG. 6 is a view in perspective, with parts broken away, showing a product which can be produced in the apparatus of FIG. 5.

The product made by the apparatus of FIG. 5, as shown in FIG. 6, comprises an inner core 117 of a vitreous material, a layer 118 of the coating material, tightly adhered to the inner core 117, and also to an exterior coating 119 of a vitreous material. Where the coating layer 118 is an appropriate metal or metal alloy, this structure can be used directly as a resistance thermometer, requiring no exterior insulation.

Figure 7:
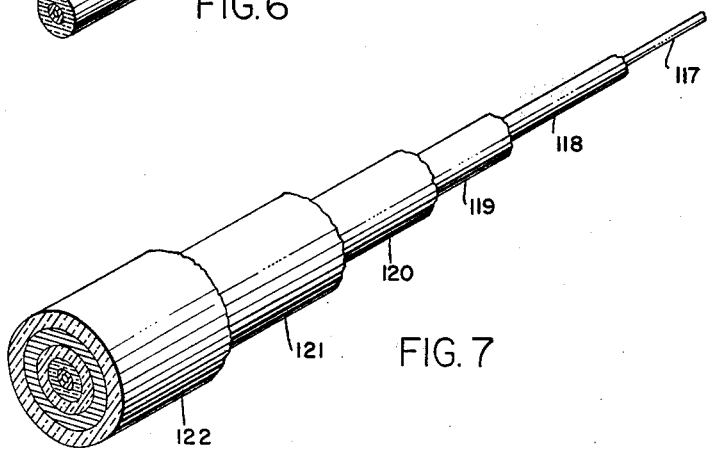
FIG. 7 is a perspective view, similar to FIG. 6, with parts broken away, showing a product that can be produced by modifying the apparatus of FIG. 5.

It will be appreciated that, if desired, a relatively small diameter rod or strand of metal, of glass or other fusible vitreous material, or the like, could be introduced into the forming cone emerging from the bushing tip 110 of the furnace 109, or that a product of the type shown in FIG. 6 could be so introduced to produce even more complex fibrous structures. For example, if a product of the type shown in FIG. 6 were introduced into the forming cone emerging from the bushing tip 110, a product of the type shown in FIG. 7 would be produced. Such product would comprise the inner core 117, the coating 118, the glass layer 119, an adjacent glass layer 120, a coating layer 121, and a final exterior glass layer 122. Such fibrous material would constitute an integral multiple plate condenser, or could be used as a shielded insulated conductor to transmit a desired signal, or in any of many other ways that will be obvious to those skilled in the art.

The invention has been described in connection with known methods for producing continuous fibers of glass or other similar fusible vitreous material. A desired modifying ingredient or constituent is introduced into the interior of a forming cone, and a correspondingly modified filament of the glass or other material is either directly collected, or longitudinally extended while still in a softened condition to effect attenuation to a desired fiber diameter, and then collected. In each instance, however, the product which is finally collected is a continuous filament. Such processing is not an essential feature of the method of the invention, as the modified primary fibers or filaments can equally well be attenuated to produce a wool-like product by a blast of air or other suitable gas, or by a liquid stream, or by a high temperature blast of combustion products from a high velocity burner where re-heating and attenuation are both effected. Final processing of the modified filaments is not represented in the drawings and can be in the described manner to produce continuous filaments, or can be in either of the described ways to produce wool-like products, as may be desired in the particular circumstances.

It will be apparent that various changes and modifications can be made from the specific details shown in the attached drawings, and discussed in connection therewith, without departing from the spirit and scope of the attached claims. In its essential details the invention comprises an improvement in a method for producing filaments of a fusible, fiberizable, vitreous material. The method comprises flowing a stream of the material, in a fused condition, through and from an enclosed zone of small cross-sectional area, and collecting a filament of the material which forms from the stream. The improvement includes intimately associating a modifying substance with a filament-forming cone of the fused material flowing from the discharge side of the enclosed zone.

What we claim is:

1. The method of forming a composite continuous fiber of mineral material with a continuous interior core of metal comprising heating a quantity of mineral material to a softened condition, flowing a stream of the softened mineral material from said quantity at a viscosity providing a filament forming cone comprising a cone-shaped region of increasing viscosity, introducing and continuously advancing a solid linear body of metal in projected relation directly into the soft interior material of said cone, heating said solid metal to a softened condition within said soft interior material of the cone, and attenuating both said softened materials of the cone into a composite filament of mineral material with the metal extended as a continuous core interiorly thereof.

2. The method of claim 1 wherein the solid linear body of metal is advanced into the interior of said cone through the side thereof.

3. The method of claim 1 wherein the solid linear body of metal is advanced into the interior of said cone in a direction axial of both the linear body and of the cone.

4. The method of forming a composite continuous fiber of mineral material with a continuous metal core interior comprising flowing a molten stream of the mineral material from an orifice at a viscosity providing a forming cone comprising a cone-shaped region of increasing viscosity, continuously advancing a solid linear body of metal in the direction of flow of said mineral material through said orifice in projected relation directly into the soft interior material of said cone, heating said metal to a softened condition within said soft interior material of the cone and attenuating both said softened materials of said cone into a composite filament of mineral material with the metal as a continuous core interiorly thereof.

5. The method of producing a composite filament of heat-softenable materials comprising heating a quantity of first heat-softenable fiberizable material to a softened condition, attenuating a continuous fiber from said softened quantity of said first material in an attenuation zone of progressively increasing viscosity, continuously advancing a solid mass of another heat-softenable material having a softening temperature less than that of said first material in projected relation directly into the interior of the attenuation zone of said first heat-softenable material in the comparatively low viscosity portion of said attenuation zone, heating said other heat-softenable material to a softened condition within said attenuation zone with heat of said first material, and attenuating both said softened materials within said attenuation zone into a continuous filament with a continuous core of said other material in the interior of the continuous filament.

(References on following page)

References Cited in the file of this patent

UNITED STATES PATENTS

| | | |
|---|---|---|
| 1,530,728 | Kucera | Mar. 24, 1925 |
| 1,750,971 | Soubier | Mar. 18, 1930 |
| 1,793,529 | Taylor | Feb. 24, 1931 |
| 2,313,296 | Lamesch | Mar. 9, 1943 |
| 2,331,944 | Von Pazsiczky et al. | Oct. 19, 1943 |
| 2,491,889 | Bennett et al. | Dec. 20, 1949 |
| 2,612,679 | Ladisch | Oct. 7, 1952 |
| 2,669,754 | Chadbourne | Feb. 23, 1954 |
| 2,699,415 | Nachtman | Jan. 11, 1955 |
| 2,736,946 | Stanton et al. | Mar. 6, 1956 |
| 2,763,099 | Slayter et al. | Sept. 18, 1956 |
| 2,767,519 | Bjorksten | Oct. 23, 1956 |
| 2,782,563 | Russell | Feb. 26, 1957 |

FOREIGN PATENTS

| | | |
|---|---|---|
| 849,842 | France | Aug. 28, 1939 |
| 520,564 | Italy | Mar. 22, 1955 |